Aug. 14, 1962 W. F. MORRISON 3,049,053
SPECTACLE FRAME MOUNT
Filed July 13, 1959
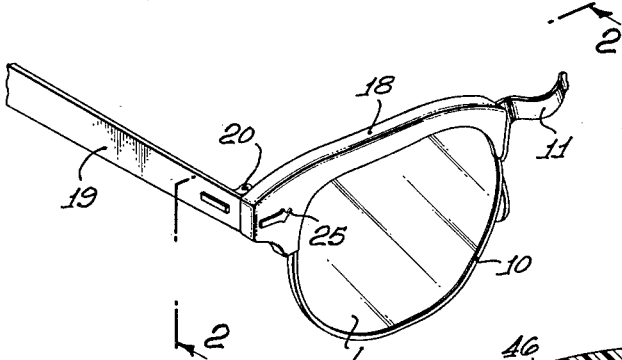
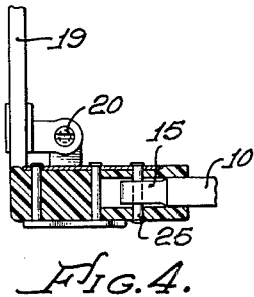
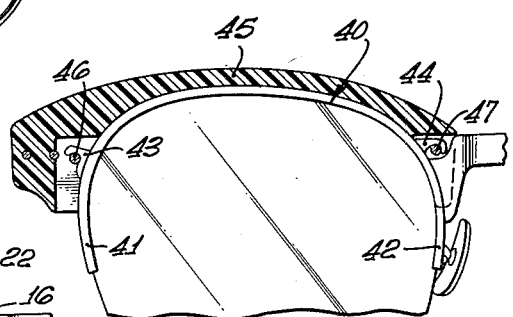
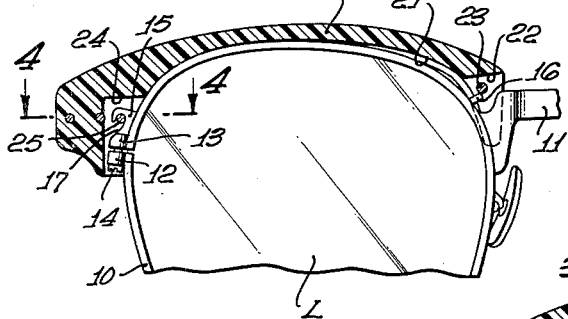
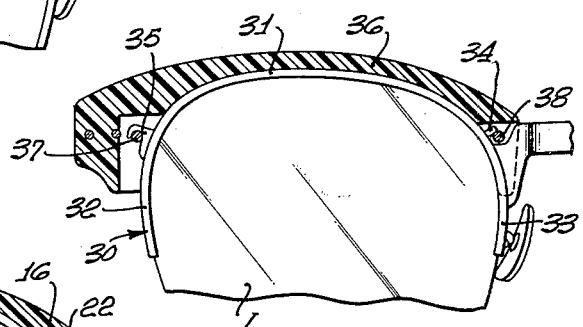
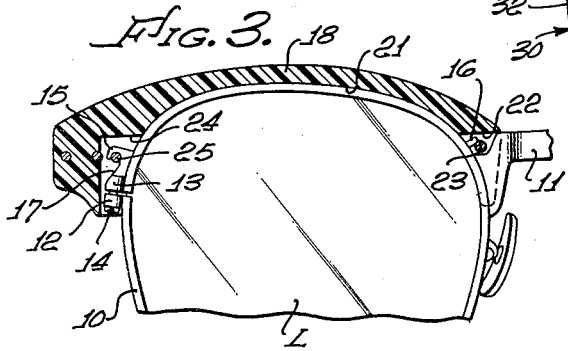
INVENTOR.
WALTER F. MORRISON
BY
Hazard & Miller
ATTORNEYS.

United States Patent Office 3,049,053
Patented Aug. 14, 1962

3,049,053
SPECTACLE FRAME MOUNT
Walter F. Morrison, 15414 Fairgrove St.,
La Puente, Calif.
Filed July 13, 1959, Ser. No. 826,551
1 Claim. (Cl. 88—41)

This invention relates to improvements in spectacle frames, and particularly to that class of spectacle frame having a chassis and removable and replaceable top rims and temples.

Explanatory of the present invention the usual spectacle frame which has replaceable top rims consists of a chassis composed of two eye wires connected by a bridge. Usually, the eye wires encircle their respective lenses entirely with the ends of the eye wires equipped with opposed knuckles that can be drawn towards each other by a connecting screw to tighten the eye wires about their respective lenses. Each eye wire is usually equipped with an upwardly extending stud near the bridge and the outer upper corner of each eye wire is usually equipped with a downwardly open hook. The top rim to which the temple is ordinarily hingedly attached is grooved on its under side to receive the top portion of the eye wire and near its inner end it has a transversely extending pin or rivet that is adapted to be hooked over the inclined stud. The outer end of the groove on the under side of the top rim is deepened or enlarged to accommodate the hook and the conventional practice has been to drive a small screw transversely across this deepened end of the groove and through the crotch of the hook to lock the top rim in applied position on the eye wire. These screws are quite small and are usually quite difficult to insert in their respective holes and tighten. Even after the top rim is in applied position the screws may loosen and may become objectionable.

An improvement over the use of screws consists in equipping the top rim with a hinged latch carrying two pins. One of these pins when the latch is swung into locking position, passes through the crotch of the hook to lock the top rim in applied position. The other pin serves as a detent to hold the latch in locking position. While this improvement eliminates the use of screws it increases the cost by reason of the addition of the latch.

An object of the present invention is to provide an improved spectacle frame of this general character which is so designed that the conventional chassis may be employed without alteration. Advantage is taken of the fact that surfaces presented by the hook and the stud on each eye wire diverge upwardly with respect to each other. Advantage is also taken of the fact that the material of which the top rim is formed is not absolutely rigid but possesses some resiliency. As the top rims are usually of arcuate shape transversely extending pins or rivets may be permanently mounted therein in the deepened or recessed ends of the groove. One pin can then be initially hooked in the crotch of the hook and the top rim flexed slightly so as to increase the spacing between the mentioned pin and the other pin which is to engage over the stud. While the top rim is in its flexed position, the pin engageable over the stud can be passed thereover and on release of the top rim, its resiliency will cause the spacing between the pins to be slightly decreased, thus locking the top rim in applied position. In this manner, I do not alter the conventional construction of the chassis and by taking advantage of the resiliency of the material of the top rim I can permanently mount the two pins that are required at the ends of the top rim and make the top rim applicable and detachable to and from the chassis by merely flexing the top rim. The objectionable use of the screws is therefore avoided and increase in the cost of manufacture is likewise eliminated.

With the foregoing and other objects in view, which will be made manifest in the following detailed description and specifically pointed out in the appended claim, reference is had to the accompanying drawings for an illustrative embodiment of the invention, wherein:

FIGURE 1 is a perspective view of a portion of a spectacle frame embodying the present invention;

FIG. 2 is a vertical section taken substantially upon the line 2—2 upon FIG. 1 in the direction indicated, illustrating the top rim in the process of being applied to the chassis;

FIG. 3 is a view similar to FIG. 2, but illustrating the top rim in its applied position;

FIG. 4 is a horizontal section taken substantially upon the line 4—4 upon FIG. 2;

FIG. 5 is a view similar to FIG. 3, but illustrating a modification; and

FIG. 6 is a view similar to FIG. 3, but illustrating another modification.

Referring to the accompanying drawings wherein similar reference characters designate similar parts throughout, the improved spectacle frame comprising two eye wires, only one of which is illustrated and which is indicated at 10. These eye wires are connected to each other by a bridge 11, thus forming a chassis. Each eye wire in the usual construction completely encircles its lens L and the ends of the eye wire are usually provided with opposed knuckles 12 and 13 through which extends a tightening screw 14. The screw 14, on being tightened, draws the eye wire into tight encircling position around the lens L.

The usual chassis above described which has applicable thereto removable and replaceable top rims, is also equipped with a downwardly open hook 15 near the outer, upper corner of the eye wire. Near the bridge 11 there is an upwardly and inwardly extending stud 16 on the eye wire.

The hook presents an outwardly facing edge or surface 17 that is upwardly divergent with respect to the inner side of the stud 16 so that in reality the hook and stud which may be regarded as constituting holding means at the upper corners of the eye wire, diverge upwardly with respect to each other.

The top rim indicated at 18 usually has a temple 19 connected thereto by means of a hinge 20. The underside of the top rim is grooved as at 21 to accommodate the top portion of the eye wire and the inner end of this groove is deepened as indicated at 22 to accommodate the stud 16. A pin or rivet 23 extends transversely across the deepened portion 22 and is adapted to be positioned beneath the stud as illustrated in FIG. 3. The other end of the groove 21 is deepened or recessed as indicated at 24 to accommodate the hook 15 and the knuckles 12 and 13.

In the conventional spectacle frame of this general character the practice has been to first position of pin 23 against the underside of the stud 16. When the pin 23 is thus under the stud the top rim is lowered onto the eye wire until it receives the hook 15. Then, a small screw has been driven transversely across the recess 24 to occupy the position of the pin, screw or rivet 25.

As above explained, however, these screws are very small and are difficult to insert in their respective holes and to screw home. In lieu thereof, I make the pin, screw, or rivet 25 a permanent installation on the top rim and I take advantage of the fact that the material of which the top rim is formed is not absolutely rigid but is slightly resilient. I also take advantage of the fact that the top rim is usually arcuate in form and can be flexed slightly from its arcuate condition towards a straighter condition. When thus flexed, the spacing between the pin 25 and the pin 23 slightly increases so that with the pin 25 in applied position in the crotch of the hook 15 I can then swing the top rim downwardly toward the top portion of the eye wire and position the pin 23 against the top of stud 16. If pressure is then applied gradually from the outer portion of the top rim toward the bridge 11, the top rim will be flexed slightly towards a straighter condition. This increases the spacing between the pin 25 and pin 23 and enables the pin 23 to be snapped over the end of the stud 16. If the top rim 18 is then released or the pressure is removed therefrom it tends to return to its normal or original arcuate condition, shortening the spacing between pin 25 and pin 23 and thus locking the top rim in applied position as indicated in FIG. 3.

It will be appreciated that whenever it is desired to remove and replace the top rim with another top rim, it is merely necessary to flex the top rim from its arcuate position towards a straighter condition. This will increase the spacing between pins 25 and 23 slightly enabling pin 23 to be passed over the end of the stud 16 after which the top rim can be bodily removed by disengaging pin 25 from the crotch of hook 15.

In the construction shown in FIG. 5, a semi-rimless spectacle frame is disclosed. Therein, the eye wire 30 does not completely encircle the lens L. It is formed of a resilient material and has a top portion 31 connecting two downwardly convergent side portions 32 and 33. These downwardly convergent side portions terminate well above the bottom of the lens L and are urged by the resiliency of the material of the eye wire to contract and grip on the side edges of the lens.

The eye wire is equipped with a stud 34 corresponding to the stud 16 and also a downwardly open hook 35 corresponding to the hook 15. The top rim 36 is of the same construction as that of the top rim 18 having a permanent pin, rivet, or screw 37 corresponding to the pin 25 that is engageable with the hook 35. It also has a permanent pin 38 corresponding to pin 23 which on flexing the top rim 36 can be snapped or sprung over the end of the stud 34 to lock the top rim in applied position. By also flexing the convergent side portion 33 of the eye wire toward a straighter condition, stud 34 will approach a more perpendicular position. In this position the space between the end of the stud 34 and hook 35 is decreased thus facilitating the snapping of pin 38 over the stud. On release of the top rim and the side portion 33 of the eye wire, the top rim will tend to contract or return to its normal arcuate condition while the distance between the stud 34 and hook 35 on the eye wire will increase. As such the top rim will be locked to the eye wire and will tend to cooperate with the material of the eye wire 30 to cause the side portions 32 and 33 to grip on the side edges of the lens L with greater effort.

It will be appreciated from the above-described constructions that it is not necessary to alter the construction of the chassis from its present conventional design. Also, it is unnecessary to alter the construction of the top rim from its present conventional design other than to make the installation of the pin, rivet, or screw 25 permanent rather than removable and replaceable. By making this pin or rivet permanent the application of the small screw and its tightening is eliminated and the increased cost of providing a hinged latch is also eliminated. The engagement between the pin 23 and the stud 16 is ordinarily adequate to retain the top rim in applied position even though the outer end of the top rim is accidentally struck with a considerable force.

In the construction shown in FIG. 6, there is an eye wire 40 which may completely encircle the lens as illustrated in FIGS. 2 and 3, or may partially encircle the lens as illustrated in FIG. 5 and as shown in this figure. If it only partially encircles the lens it is formed of a resilient material with downwardly convergent side portions 41 and 42 intended to grip on the downwardly convergent side edges of the lens. The eye wire is equipped at its outer side with a downwardly open hook 43. This hook which is at the location of hook 15 is a somewhat shallower hook than hook 15. At the inner or nasal side there is a downwardly open hook 44 which is of considerable depth similar to the depth of hook 15. If desired, this hook may be formed of the metal forming the bridge. The top rim 45 is of the same construction as that of the top rim 18 having a permanent pin, rivet, or screw 46, and a permanent pin, rivet or screw 47. The pin 47 is first engaged in the hook 44 and the pin 46 is initially positioned over the top of hook 43. Due to the fact that the top rim 45 is arcuate in form and formed of resilient material, by applying pressure gradually from adjacent the nasal end of the top rim outwardly the top rim will be flexed and straightened slightly from its arcuate condition lengthening the space between pins 46 and 47 a sufficient distance to snap pin 46 over hook 43.

The snapping of pin 46 over hook 43 can be further facilitated by straightening side portion 41 of the eye wire in the same manner as described hereinabove with respect to the construction shown in FIG. 5.

From the above-described constructions it will be appreciated that the improved construction does not require serious alteration of conventional designs of eye wires or top rims now in general use, but enables top rims to be applied to and detached from eye wires readily without applying or screwing home the minute screws heretofore usually employed.

Various changes may be made in the details of construction without departing from the spirit and scope of the invention as defined by the appended claim.

I claim:

A spectacle frame comprising eye wires connected to each other by a bridge, said eye wires being formed of resilient material and having top portions and downwardly convergent side portions adapted to resiliently grip against downwardly convergent side edges of lenses placed therein, each eye wire having holding means near the ends of the top portion of the eye wire, said holding means presenting surfaces which diverge upwardly from each other, each of said convergent side portions being adapted to be flexed to decrease the spacing between said upwardly diverging surfaces on said holding means and a top rim for each eye wire having retaining means adjacent the ends thereof engageable with the holding means, respectively, each top rim being resilient and being adapted to be flexed to increase the spacing of the retaining means so that they may be passed over the most divergent portions of the surfaces of the holding means, and then on release of the holding means and the retaining means, said holding means expanding and said retaining means contracting to retain the top rims on the eye wires.

References Cited in the file of this patent

UNITED STATES PATENTS

| | | |
|---|---|---|
| 2,585,352 | Silverman | Feb. 12, 1952 |
| 2,748,655 | Rohrbach | June 5, 1956 |
| 2,786,391 | Lutes | Mar. 26, 1957 |
| 2,922,238 | Neary | Jan. 26, 1960 |
| 2,952,187 | Neary | Sept. 13, 1960 |

FOREIGN PATENTS

| | | |
|---|---|---|
| 782,915 | Great Britain | Sept. 18, 1957 |